US000001955H

(19) United States

(12) Statutory Invention Registration

Middlesworth et al.

(10) Reg. No.: US H1955 H

(43) Published: *Apr. 3, 2001

(54) POLYOLEFIN/FILLER FILMS HAVING INCREASED WVTR AND METHOD FOR MAKING

(75) Inventors: Jeffrey Alan Middlesworth, Wauconda; Kevin Arthur Brady, Cary, both of IL (US)

(73) Assignee: Exxon Chemical Patents Inc., Houston, TX (US)

( * ) Notice: This patent issued on a continued prosecution application filed under 37 CFR 1.53(d), and is subject to the twenty year patent term provisions of 35 U.S.C. 154(a)(2).

(21) Appl. No.: 08/691,104

(22) Filed: Jul. 31, 1996

(51) Int. Cl.[7] ..... C08K 3/26

(52) U.S. Cl. ..... 524/427; 428/155; 428/159; 428/317.9; 428/409; 428/457; 428/461; 428/910; 264/176.1; 264/288.4; 264/288.8; 524/81; 524/425; 524/442; 524/445; 524/447; 524/448; 524/449; 524/450; 524/585

(58) Field of Search ..... 428/155, 159, 428/317.9, 409, 457, 910, 461; 264/176.1, 288.4, 288.8; 524/427, 81, 425, 442, 445, 447, 448, 449, 450, 585

(56) References Cited

U.S. PATENT DOCUMENTS

| | | | |
|---|---|---|---|
| 4,350,655 | 9/1982 | Hoge | 264/145 |
| 4,472,328 | 9/1984 | Sugimoto et al. | 264/41 |
| 4,777,073 | 10/1988 | Sheth | 428/155 |
| 4,929,303 | 5/1990 | Sheth . | |
| 5,055,338 | 10/1991 | Sheth et al. | 428/155 |

FOREIGN PATENT DOCUMENTS

| | | |
|---|---|---|
| 0 227 037 A2 | 7/1987 | (EP) . |
| 0 288 021 A2 | 10/1988 | (EP) . |
| 0 691 203 | 1/1996 | (EP) . |
| 2 151 53800 | 7/1995 | (GB) . |
| 2 285 408 | 7/1995 | (GB) . |
| 2 290 052 | 12/1995 | (GB) . |
| 7-118431 | 5/1995 | (JP) . |
| 07 118431 | 9/1995 | (JP) . |
| WO 95/02630 | 1/1995 | (WO) . |

*Primary Examiner*—John M. Cooney, Jr.

(74) *Attorney, Agent, or Firm*—Thomason, Moser & Patterson, L.L.P.

(57) ABSTRACT

Films, made of polyethylenes and fillers, and articles made therefrom greater WVTR than previously available films based on conventional Ziegler-Natta based polyethylenes. The polyethylenes are produced in a metallocene-catalyzed production process. The films may be made by a cast film process, and may be made in widely varying filler content, generally polyethylene to filler ratios of 30/70 to 70/30. The metallocene based polyethylenes when combined with filler also permit the extrusion of thinner films leading to lighter weight and softer films. The m-polyethylenes utilized for making such films typically have a Composition Distribution Breadth Index above 50%, a $M_w/M_n$ below 3, and a $M_z/M_w$ below 2.

9 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

POLYOLEFIN/FILLER FILMS HAVING INCREASED WVTR AND METHOD FOR MAKING

TECHNICAL FIELD

This invention relates generally to polyolefin films having greatly increased WVTR (Water Vapor Transmission Rate) and methods of making same. More specifically this invention is directed toward filled polyethylene films having increased WVTR at a given filler loading, and a given set of process conditions.

BACKGROUND

Preparation of films having good WVTR from highly filled polymers, usually polyolefins, are known. In the past a combination of a polyolefin, usually a polyethylene, with a filler, usually $CaCO_3$, while very useful and widely used as a film with good WVTR, usually in combination with non-woven polymers (for use in diapers, adult incontinence devices, feminine hygiene articles, housewrap composites, roofing materials and the like), have had some limitations that were well known in the industry.

Among these limitations are a practical limitation in thickness (also expressed as basis weight) in that conventional Ziegler-Natta catalyzed polymers, more specifically linear low density polyethylene (LLDPE) highly filled film formulations could not generally be drawn down below 3 mils. The most obvious problem with such a limitation is that the user of the film could not make a product utilizing a lower thickness film, meaning that the cost of the film (usually sold on a weight basis) might have been higher than the application necessitated. A less obvious issue is that at lower thicknesses, for the same density resin at the same filler loading, the product would be relatively softer than higher thicknesses, an attribute of importance in any article that comes in contact with humans, such as apparel.

Another limitation of previous polyethylene/filler films is that for a given filler loading, with conventional Z-N catalyzed polyethylene resins, is WVTR, limited (on the end) by the amount of post-extrusion orientation that could be practically achieved. Additionally, the imperfections often found in conventional Z-N resins and films, such as gels, made reaching and maintaining a high rate of production difficult, and a high level of orientation might often lead to breaks, holes, or tear offs in the film leading to lower prime production rates.

Yet another limitation of the conventional Z-N filled and oriented films is related to both WVTR and production rates. Specifically, with a given conventional filled polyethylene, to attain a certain WVTR, a certain filler loading had to be used. In general, within limits, the higher the filler loading, the more difficult to process (the above referenced production problems such as large void creation and tear offs are exacerbated by a higher filler loading, as the film maker seeks to maximize production rates).

U.S. Pat. No. 4,777,073 suggests a permeability and strength of polyethylene/filler combinations may be attained by combining a LLDPE described as being made using a Ziegler-Natta or chromium catalysts, with fillers such as $CaCO_3$ present in the LLDPE from 15 to 35 percent by volume which is equivalent to 34–62% by weight.

There is a commercial need therefore for a polyethylene filler combination that will give a higher, at a given filler loading, at an equivalent thickness. There is a similar need for a polyethylene filler combination that can deliver equivalent WVTR at lower filler loadings and can be made at a lower basis weight, than a conventional Z-N polyethylene/filler combination.

SUMMARY

We have discovered that making a film from a polyethylene/filler combination using a metallocene catalyzed polyethylene, surprisingly and unexpectedly provides the ability to achieve a substantially higher WVTR (at comparable filler loading and thickness), a lower thickness (or basis weight) (at comparable filler loading and orientation), and can achieve an equivalent WVTR at lower filler loadings (improving processability) when compared to conventional Z-N polyethylene/filler combination.

The metallocene catalyzed polyethylenes (m-polyethylene) will have a molecular weight distribution (defined as the ratio of weight to the number average molecular weight $M_w/M_n$) generally less than 3, preferably less than 2.5.

The drawdown of a filled m-polyethylene will be more than 10, preferably more than 20, more preferably more than 30 percent less than the ultimate drawdown of a filled Z-N polyethylene, where the relationship in the filled Z-N polyethylene between the filler amount and basis weight (minimum) for films follow the general equation:

$$W=2.20+0.380\ (\text{weight \% } CaCO_3)$$

where W is the minimum basis weight in g/m2 in the film.

The relationship is at constant draw (orientation transverse direction or TD) of 2.7:1, line speed 340 feet per minute (fpm). For m-polyethylene filled formulations the following general equation applies:

$$W=3.07+0.207\ (\text{weight \% } CaCO_3)$$

Additionally the water vapor transmission rate (WVTR) of a filled m-polyethylene is at least 10 percent greater, preferably at least 20 percent, more preferably at least 30 percent greater than a filled Z-N polyethylene, at the same filler loading and thickness (basis weight), where the Z-N polyethylene/filler WVTR is described by the equation:

$$WVTR=-10{,}900+320\ (\text{weight \% } CaCO_3)$$

where the WVTR is in $g/m^2/24$ hours, measured at 37.8° C., 90% RH. While a film including a m-polyethylene and filler follows the general equation:

$$WVTR=-9967+358\ (\text{weight \% } CaCo_3)$$

The relationship is at constant draw (orientation TD) of 2.7:1, line speed 340 feet per minute (fpm).

BRIEF DESCRIPTION OF THE DRAWINGS

The foregoing aspects, features and advantages of the present invention will become clearer and more fully understood when the following detailed description, and appended claims are read in conjunction with the accompanying drawings, in which:

DETAILED DESCRIPTION

Introduction

Figure 1:
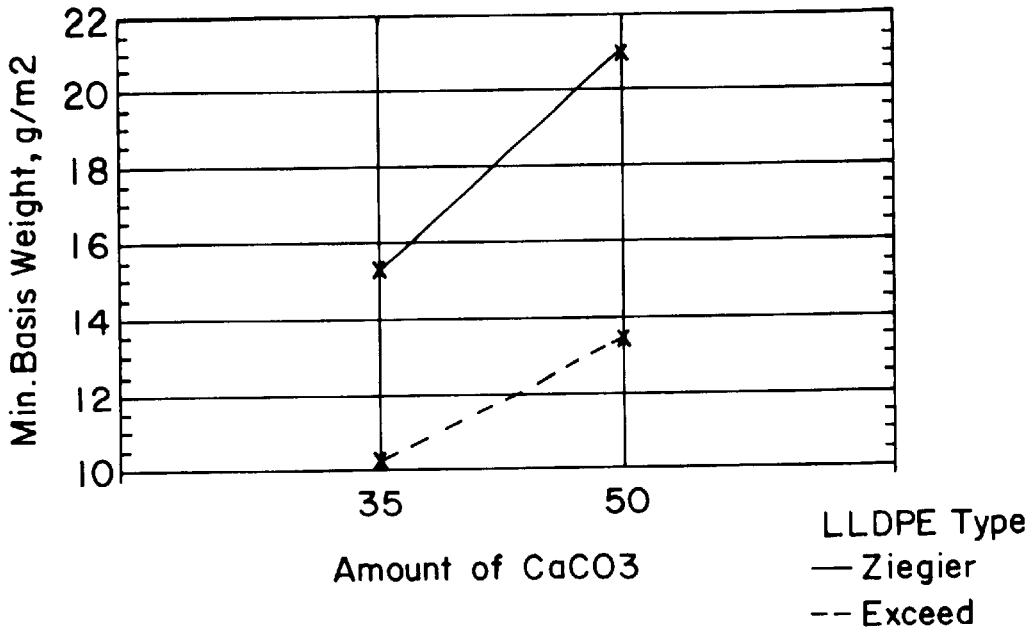
FIG. 1 illustrates the drawdown advantage of filled m-polyethylene over Z-N polyethylene with a plot of minimum basis weight in g/m2 versus filler loading.

This invention concerns certain polyethylene/filler films that will have high WVTR and the ability to be drawn down to low basis weights and methods for making same. Particularly useful in these films and methods will be m-polyethylenes.

In certain embodiments of the present invention films of m-polyethylene and filler can be made with lower amounts of filler and still attain substantially the same WVTR as previously known and used Z-N polyethylene/filler combinations (at higher filler loadings) are also contemplated. This invention further includes certain m-polyethylenes, their conversion into fabricated articles such as films, articles made from such films, and applications in which such articles having high WVTR combined with good physical properties are desirable. The resulting films, and film composites, (including coextruded and laminated films) have combinations of properties rendering them superior and unique to films or film composites previously available. The filled m-polyethylene films disclosed herein are particularly well suited for use in producing certain classes of high WVTR films, consumer and industrial articles using the films in combination with for instance, polymeric woven or non-woven materials. Such consumer articles include, but are not limited to diapers, adult incontinence devices, feminine hygiene articles, medical and surgical gowns, medical drapes, industrial apparel, building products such as "housewrap", roofing components, and the like made using one or more of the films disclosed herein. Additionally the films having increased WVTR of the present invention may also be used in metallized films with a high WVTR, according to the disclosure of U.S. Pat. 5,055,338, fully incorporated herein for purposes of U.S. Patent practice.

In an embodiment of our invention, the filled m-polyethylene films, when oriented after film formation, would surprisingly and unexpectedly have high WVTR when compared to a filled polyethylene film made using previously available Z-N catalyzed polyethylenes. Following is a detailed description of certain preferred m-polyethylenes, films, or film composites made using these m-polyethylenes and articles made from the films or film composites, that are within the scope of the present invention. Those skilled in the art will appreciate that numerous modifications to these preferred embodiments can be made without departing from the scope of the invention. For example, although films based on low density m-polyethylenes filled with $CaCO_3$ are exemplified herein, the films be made using combinations of m-polyethylenes with other polyolefins and with other fillers or filler combinations. To the extent my description is specific, it is solely for the purpose of illustrating preferred embodiments of my invention and should not be taken as limiting the present invention to these specific embodiments.

Production of the Films

Films contemplated by certain embodiments of the present invention may be made utilizing m-polyethylenes, by processes including, blown and cast, preferred is a cast film process. In such extrusion processes, the films of the present invention can be formed into a single layer film, or may be one layer or more of a multi-layer film or film composite. Alternatively, the m-polyethylene films described in this disclosure can be formed or utilized in the from a resin blend where the blend components can function to modify WVTR, physical properties, draw-down sealing, cost, or other unctions. Both blend components and functions provided thereby will be known to those of ordinary skill in the art. Films of the present invention may also be included in laminated structures. As long as a film, multi layer film, or laminated structure includes one or more m-polethylene/filler film layers having the WVTR, or draw-down, and the like of the film, and then $M_w/M_n$, CDBI and the like of the m-polyethylene, in the ranges described herein, it will be understood to be contemplated as an embodiment of the present invention.

Polyolefin Component

The polyolefin component can be any film forming polyolefin or polyolefin blend, as long as the majority of the polyolefin component is a polyolefin with the following features:

| | preferred | more preferred | most preferred |
|---|---|---|---|
| $M_w/M_n$ | <3 | <2.5 | |
| CDBI | >50% | >60% | >65% |
| $M_z/M_n$ | <2 | | |

Generally these ranges dictate the use of a metallocene catalyzed polyolefin, preferred is a m-polyethylene, preferably a linear low density m-polyethylene with a density in the range of from about 0.90–0.940, preferred 0.910–0.935, more preferred 0.912–0.925 g/cc. Densities referred to herein will generally be polymer or resin densities, unless otherwise specified.

There is a wide variety of commercial and experimental m-polyethylene resins useful in the manufacture of films included in certain embodiments of the present invention. A non-inclusive list is found below along with the general bulk resin properties as published:

TABLE A

| Commercial Designation | Density ($g/cm^3$) | Melt Index/ Melt Flow (g/10 min.) | Type |
|---|---|---|---|
| Exceed ® 103 (now 350L65 or 350D60)* | 0.917 | 1.0 | eth/hexene |
| Exceed ® 301 now 357C80* | 0.918 | 3.4 | eth/hexene |
| Exceed ® 377D60* | 0.922 | 1.0 | eth/hexene |
| Exceed ® 109* | 0.925 | 0.75 | eth/hexene |
| Exact ® 3028* | 0.900 | 1.2 | eth/butene |
| Exceed ® 357C32+ | 0.917 g/cc | 3.4 | |
| Exceed ® 363C32 | 0.917 g/cc | 2.5 | |
| ECD-401 | 0.917 g/cc | 4.5 | |
| Exceed ® 377D60 | 0.922 g/cc | 1.0 | |
| Exceed ® 399L60 | 0.925 g/cc | .75 | |

*available from Exxon Chemical Co. Houston, TX, USA
+The Exceed ® 357C32 is the same resin grade as the ECD-112 and ECD-115 used in the experiments.

It will be understood that in general we contemplate that a large number of m-polyethylenes will be useful in the techniques and applications described herein. Included components: ethylene-1-butene copolymers, ethylene-1-hexene copolymers, ethylene-1-octene copolymers, ethylene-4-methyl-1-pentene copolymers, ethylene dodecene copolymers, ethylene-1-pentene copolymers, as well as ethylene copolymers of one or more C4 to C20 containing alpha-olefins, diolefins, and combinations thereof. A nonexclusive list of such polymers; ethylene, 1-butene, 1-pentene; ethylene, 1-butene, 1-hexene; ethylene, 1-butene, 1-octene, ethylene, 1-butene, decene; ethylene, 1-pentene, 1-hexene; ethylene, 1-pentene, 1-octene; ethylene, 1-pentene, decene; ethylene, 1-octene; 1-pentene; ethylene 1-octene, decene; ethylene, 4-methyl-1-pentene, 1-butene; ethylene 4-methyl-1-pentene, 1-pentene; ethylene, 4-methyl-1-pentene, 1-hexene; ethylene 4-methyl-1-pentene, 1-octene; ethylene, 4-methyl-1-pentene, decene. Included in the ethylene copolymers will be one or more of the above monomers included at a total level of 0.2 to 6 mole percent, preferably 0.5 to 4 mole percent, or such mole percents consistent with the resin densities contemplated.

Definitions and methods of determination of CDBR may be found in U.S. Pat. No. 5,008,204 which is fully incorporated by reference herein for purposes of U.S. patent practice.

The resin and product properties recited in this specification were determined in accordance with the following test procedures. Where any of these properties is referenced in the appended claims, it is to be measured in accordance with the specified test procedure.

TABLE B

| Property | Units | Procedure |
|---|---|---|
| Melt Index | dg/min | ASTM D-1238(E) |
| Density | g/cc | ASTM D-1505 |
| WVTR | $g/m^2day$ | described herein |
| Gurley | seconds | described herein |

FILLER

Fillers useful in this invention may be any inorganic or organic material having a low affinity for and a significantly lower elasticity than the polyolefin component. Preferably the filler should be a rigid material having a non-smooth hydrophobic surface, or a material which is treated to render its surface hydrophobic. The preferred mean average particle size of the filler is between about 0.5–5 microns for films generally having a thickness of between 1–6 mils prior to stretching. Examples of the inorganic fillers include calcium carbonate, talc, clay, kaolin, silica, diatomaceous earth, magnesium carbonate, barium carbonate, magnesium sulfate, barium sulfate, calcium sulfate, aluminum hydroxide, zinc oxide, magnesium hydroxide, calcium oxide, magnesium oxide, titanium oxide, alumina, mica, glass powder, zeolite, silica clay, etc. Calcium carbonate is particularly preferred for low cost, whiteness, inertness, and availability. The inorganic filler such as calcium carbonate are preferably surface treated to be hydrophobic so that the filler can repel water to reduce agglomeration of the filler. Also, the surface coating should improve binding of the filler to the polymer while allowing the fuller to be pulled away from the polyolefin under stress. A preferred coating is calcium stearate which is FDA compliant and readily available. Organic fillers such as wood powder, and other cellulose type powders may be used. Polymer powders such as Teflon ® powder and Kevlar® powder can also be used.

The amount of filler added to the polyethylene depends on the desired properties of the film including tear strength, water vapor transmission rate, and stretchability. However, it is believed that a film with good WVTR generally cannot be produced as is taught herein with an amount of filler less than about 20 percent by weight of the polyolefin/filler composition.

The minimum amount of filler is needed to insure the interconnection within the film of voids created at the situs of the filler particularly by the stretching operation to be subsequently performed on the precursor film. Further, it is believed that useful films could not be made with an amount of the filler excess of about 70 percent by weight of the polyolefin/filler composition. Higher amounts of filler may cause difficulty in compounding and significant losses in strength of the final breathable film.

While a broad range of fillers has been described at a broad range of inclusion parameters based on weight percentages, other embodiments are contemplated. For instance, fillers with much higher or much lower specific gravities may be included in the polyolefin at amounts outside the weight ranges disclosed, they will be understood to be contemplated as embodiments of our invention as long as the final film, after orientation has WVTR or drawn down similar to that described herein.

STRETCHING OR ORIENTING AND HEAT SETTING

Final preparation of a breathable film is achieved by stretching the filled m-polyethylene precursor film to form interconnected voids. Stretching or "Orientation" of the film may be carried out monoaxially in the machine direction (MD) or the transverse direction(TD) or in both directions (biaxially) either simultaneously or sequentially using conventional equipment and processes following cooling of the precursor film.

Film orientation may also be carried out in a tentering device with or without MD orientation to impart TD orientation to the film. The film is gripped by the edges for processing through the tentering device.

Stretching of melt embossed precursor films with a tentering device at a film speed of about 200–500 feet per minute produces breathable films having the desired water vapor permeability. The resulting films had a greater permeability in the areas of reduced thickness in comparison to the areas of greater thickness.

A range of stretching ratios from 2:1 to 5:1 prove satisfactory for MD stretching with a ratio of 4:1 being preferred. A range of stretching ratios of 2:1 to 5:1 prove satisfactory for TD stretching with a ratio of 3:1 being preferred.

It is preferred that tension be maintained on the film during the heat setting and cooling to minimize shrinkback. Upon cooling to ambient temperature (i.e., room temperature) or near ambient, the holding force may be released. The film may contract somewhat (snapback) in the TD but will retain a substantial portion of its stretched dimension.

Heat setting can be accomplished by maintaining the film under tension in the stretched condition at the heat setting temperature for about 1–2 minutes. Preferably, however, the heat setting and cooling is carried out while permitting the film to contract slightly, but still under stress. The controlled shrinkback of from 5 to 30%, preferably between 15 and 25%, of the maximum stretched width has given particularly good results in eliminating storage shrinkage.

PROPERTIES OF FILMS PRODUCED FROM THE RESINS

WVTR

In an embodiment of the present invention, certain films and articles made therefrom have higher WVTR than previously thought possible. The WVTR of such films should be above 100 $g/m^2/day$ @ 37.8° C., 90% RH, preferably above 1000, more preferably above 3000, more $g/m^2/day$ @ 250° C. This can be seen in FIG. 2 which illustrates the WVTR advantage of m-polyethylene versus Z-N polyethylene in a plot of WVTR versus percentage of filler $CaCO_3$.

In general the films of embodiments of the present invention will have a much higher WVTR at the same filler loading than previously known Z-N polyethylene based filled films. Specifically, the inventive films will have a at least 10% higher than the WVTR of the comparative films described by the equation:

$$WVTR=-10{,}900+320\ (\text{weight \% } CaCO_3)$$

In another embodiment of our invention a m-polyethylene/filler combination film can be stretched (oriented or tentered in the TD) less than a Z-N polyethylene combination film, and still achieve substantially the same (at generally the same filler loadings). This is a significant advantage to a film maker because the greater the orientation, the greater the chance for a film imperfection to be magnified, potentially causing a catastrophic failure (break).

It is not beyond the scope of embodiments of my invention to blend the m-polyolefins to form the films of the invention with other materials such as other linear polyethylenes (HDPE, MDPE, LLDPE), low density polyethylene (LDPE), polypropylene (PP) (homopolymers and copolymers), polybutene-1 (PB), ethylene vinyl acetate (EVA), or other ethylene polar comonomer copolymers and the like to fabricate useful articles. Such potential blend polyolefins may be conventional Ziegler-Natta catalyzed, chromium catalyzed, free radical initiated, and the like. However, the WVTR of the layer or layers intended to impart WVTR should generally be within limits disclosed above. Additionally, any blend component or components additive or additives should be chosen such that the desired WVTR of the film remains at or above the targeted or desired value. Any blend should preferably contain a majority of m-polyethylene as the polyolefin component, specifically greater than 50 weight percent, preferably greater than 60 weight percent, more preferably greater than 70 percent, based on the total weight of the polyolefin Definitions and Test Protocols

| Value | Units | Definition or Test |
|---|---|---|
| Density | $g/cm^3$ | ASTM D-92 |
| CDBI | % | *Definitions test determination contained in this application |
| Molecular weight distribution | none | |

TEST METHODS

Water Vapor Transmission Rate

The WVTR test measures the quantity of water vapor that is able to pass through a film. A Mocon Permatran W-1 unit is used to measure WVTR by passing a stream of dry air across the surfaces of the film. The dry air picks up moisture that has passed, from wet pads underneath the film, through to the top surface.

The moisture level is measured by an infrared (IR) detector and converted to a voltage which can be measured on a chart recorder. The procedure also includes:

a) Punching out a die cut hole in an aluminum foil mask, b) Cutting off two opposing corners of the mask, c) Peeling paper backing off of mask, d) Cutting 2"×2" squares of film and place them over the hole in the mask, e) Putting the paper backing back on the foil mask, then f) Placing the masked sample in the test cell with the aluminum side up.

The chart recorder reading is multiplied by 100 to give the WVTR value.

Gurley Porosity

Teleyn Gurley Model 4190 Porosity Tester with sensitivity attachment is used. With the procedure as follows:

a) Cutting a strip of film (~2" wide) across the entire web width, b) Inserting a film sample to be tested between orifice plates, c) Setting the sensitivity adjustment on "5", d) Turning the inner cylinder so that the timer eye is vertically centered below the 10 cc silver step on the cylinder, e) Resetting the timer to zero, f) Pulling the spring clear of the top flange and releasing the cylinder, When the timer stops counting, the test is completed. The number of counts is multiplied by 10 and the resulting number is "Gurley seconds per 100 cc".

It will be appreciated by those of ordinary skill in the art that the films of m-polyethylene resins of certain embodiments of the present invention, can be combined with other materials, depending on the intended function of the resulting film.

Other methods of improving and/or controlling WVTR properties of the film or container may be used in addition to the methods described herein without departing from the intended scope of my invention. For example, mechanical treatment such as micro pores.

DRAWDOWN

Embodiments of the present invention offer a significant and unexpected improvement in the ability for the formulations to be drawn down. Specifically, using conventional Z-N polyethylenes, a lower limit of 2.5, more practically 3.5 mils has routinely been observed (as extruded) upstream, i.e. before orientation. By contrast, films of embodiments of the present invention, may be drawn down to a practical limit of 2 mils, providing a significant advantage in terms of either economics or a combination of economics and softness. The softness comes about due to the decreased modulus of the lower thickness. Ultimate drawdown is defined as minimum gage (or basis weight) before the onset of draw resonance at a given extruder rate (e.g., 1b./hr).

Figure 2:
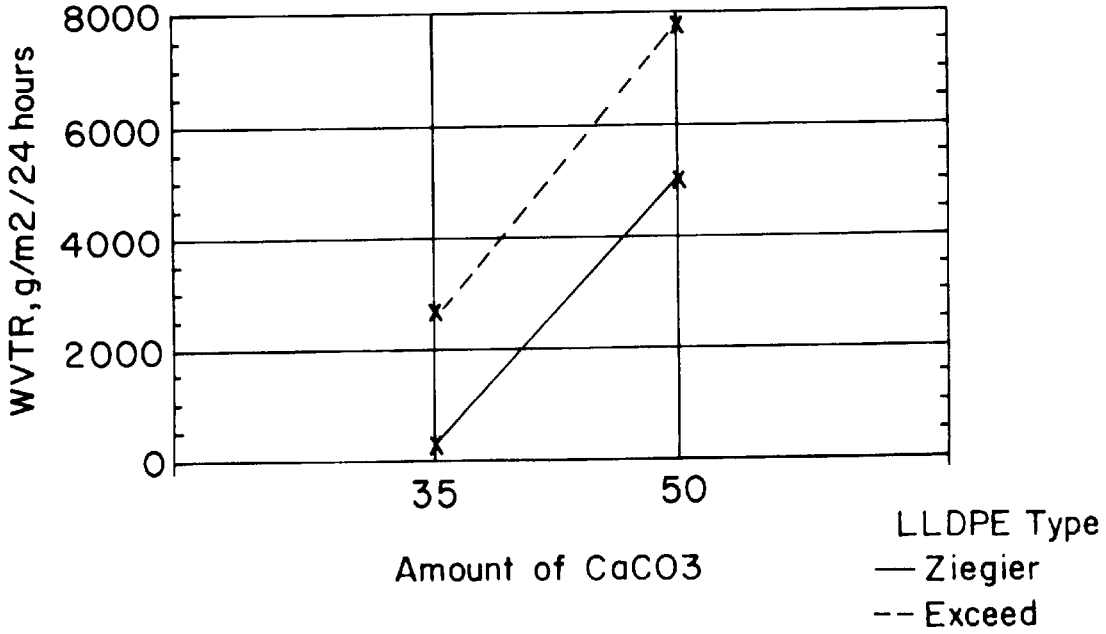
FIG. 2 illustrates the WVTR advantage of m-polyethylene versus Z-N polyethylene in a plot of WVTR versus percentage of filler $CaCO_3$ both at 2.7:1 draw ratio and 22 $g/m^2$ basis weight.

The films of embodiments of the present invention will have ultimate drawdown more than 20%, preferably 25%, more preferably 30% less than that of filled Z-N polyethylene which, from FIG. 2 has an ultimate drawdown described by the general formula:

$$W=2.1+0.380\ (\text{weight \% } CaCO_3)$$

EXAMPLES

All polyethylene/filler materials were stabilized to diminish the effects of extrusion.

Orientation of all the following examples was performed at a 2.7:1 draw ratio, at 35 fpm, 150–220° F. tenter temperature, 180–230° F. annealing temperature.

Examples 1–3

Examples 1–3 were fabricated from Escorene™ LL 3003.09 on a 6 inch Marshall & Williams cast extrusion line at normal processing conditions processing conditions listed in Table 1*a*.

Example 1 used a 50/50 weight ratio of the polyethylene to $CaCO_3$, while examples 2–3 used a 65/35 ratio of polyethylene to filler all films were subsequently oriented (TD) to three different basis weights as seen in Table 1.

Examples 4–9

Examples 4–9 were fabricated from Exceed™ ECD-112, under the same processing conditions as examples 1–3. Examples 4–6 used a 50/50 weight ratio of the polyethylene to $CaCO_3$, while examples 7–9 used a 65/35 ratio of polyethylene to filler. All films were subsequently oriented (TD) to three different basis weights as seen in Table 2.

From the data in Table 1 for each of these examples run, it can be seen that in Example 1 and 2; as filler level goes down, WVTR goes down dramatically, and as seen from example 3 a lower basis weight only marginally increases the WVTR of the film with a higher percentage of polyethylene. By contrast, from table 2 for examples 4–9, a much higher WVTR is achieved by the same filler loading and basis weight, than for the films of examples 1–3, moreover, while a higher percentage of polyethylene in the formulation (examples 4–6 vs. 7–9) generates a diminution of WVTR, the percentage is far lower than that experienced for the Z-N polyethylene of examples 1–3 (95% reduction vs. 68% reduction)

Examples 10–15

Examples 10–15 are run as in Example 4–9, but the polyolefin component was a blend of LD-202 (12-ME, 0.917 g/cc low density polyethylene available from Exxon Chemical Co.) and ECD112. As can be seen from the data in Table 3, at the same basis weight Examples 4–6, and 7–9, the corresponding films of Examples 10–15 had somewhat lower, but still acceptable WVTR. Also of note is Example 15 which was the lowest basis weight attainable in this series (1–15) of examples (again orientation was TD).

Examples 16–23

Examples 16–23 were extruded similar conditions to the previous examples, into two (2) thickness of precursor (before orientation) film (4.5 and 6 mils) and oriented in the MD at 175° F. While WVTR results for this set of examples appear to be substantially the for both metallocene and Z-N polyethylenes, it is anticipated that when the orientation speed is increased, the m-LLDPE will show improved WVTR over the Z-NLLDPE, just as found in the TD orientation in examples 1–15. The results are shown in Tables 4 and 5.

Examples 24–25

Examples 24 and 25 were extruded under substantially the same conditions as the previous examples. Examples 24 is substantially the same in polyethylene/filler content as example 4 and example 24 is substantially the same make-up as example 1.

Example 24 was drawn (oriented) at a 2.7:1 draw ratio, while example 25 was drawn at a 3.8:1 ratio. These examples show that the m-LLDPE at a lower (28%) draw ratio than the Z-N LLDPE, example 24 has generally the same WVTR. The results are shown in Table 6.

While the present invention has been described and illustrated by reference to particular embodiments thereof, it will be appreciated by those of ordinary skill in the art that the invention lends itself to variations not necessarily illustrated herein. For example, it is not beyond the scope of this invention to include additives with the claimed films or to blend resins to form the claimed films with other polymers or laminate the claimed films to other materials such as polymer non-wovens and the like. For this reason, then, reference should be made solely to the appended claims for purposes of determining the true scope of the present invention.

TABLE 1

ORIENTED FILM PROPERTIES
LL 3003.09 Based Samples

| PROPERTIES | Example 1 | Example 2 | Example 3 |
|---|---|---|---|
| Basis Wt., g/m$^2$ | 22.1 | 22.5 | 18.7 |
| Yield, yd$^2$/lb. | 24.6 | 24.1 | 29.0 |
| Emb. Cal., mils | 1.17 | 1.13 | .98 |
| Gurley, seconds | 1137 | Off-Scale | Off-Scale |
| WVTR, g/m$^2$/24 | 5100 | 300 | 500 |
| MD Tear, g | 473 | 486 | 386 |
| TD 170° F. | 9 | 8.5 | 7.8 |
| Opacity, % | 59.5 | 39.1 | 38.1 |
| MD 10%, g/in | 319.8 | 417.9 | 392.0 |
| MD 25%, g/in | 352.1 | 429.6 | 414.1 |
| MD Ult, g/in | 456.2 | 494.4 | 492.3 |
| MD Elg, % | 343.8 | 340.8 | 358.6 |
| TD 10%, g/in | 638.0 | 900.4 | 728.0 |
| TD 23%, g/in | 1092 | 1391 | 1134 |
| TD Ult, g/in | 1725 | 2025 | 1842 |
| TD Elg., % | 127.1 | 131.6 | 136.5 |
| DR Limit g/m$^2$ | 21.1 | 15.4 | — |

●The "DR Limit" also know as "Ultimate Drawdown" is the basis weight at which we first observed draw resonance. The DR probe was conducted with the fpm fixed at 340 and the extruder RPM reduced gradually until the onset of draw resonance.

TABLE 1a

Extrusion Conditions
(for 22 g/m$^2$ samples)

| CONDITION | Example 1 | Example 2 | Example 4 | Example 7 | Example 10 | Example 14 |
|---|---|---|---|---|---|---|
| Ext. RPM | 23.0 | 26.4 | 19.1 | 21.6 | 29.5 | 31 |
| Upstream, psi | 3480 | — | 3740 | 3730 | 4630 | 4430 |
| Down, psi | 1310 | — | 1370 | 1160 | 1630 | 1490 |
| Melt Temp., F. | 427 | 436 | 430 | 431 | 458 | 451 |
| Up Width, " | 23.4 | 23.3 | 21.8 | 21.8 | 31.1 | 30.4 |
| Down Width, " | — | 60.9 | 62.6 | 62.1 | 86.4 | — |
| Cast Roll, fpm | 318 | 341 | 340 | 340 | 339 | 340 |

draw ratio for all examples targeted at 2.7–1, (ratio of outlet width divided by inlet width)

TABLE 2

ORIENTED FILM PROPERTIES
For Exceed ™ ECD-112 Based Samples

| PROPERTIES Basis wt $g/m^2$ (Target) | Example 4 22 $g/m^2$ | Example 5 18.5 $g/m^2$ | Example 6 15 $g/m^2$ | Example 7 22 $g/m^2$ | Example 8 18.5 $g/m^2$ | Example 9 15 $g/m^2$ |
|---|---|---|---|---|---|---|
| Basis Wt., $g/m^2$ | 22.7 | 18.6 | 15.2 | 22.8 | 19.2 | 14.8 |
| Yield, $yd^2/lb.$ | 23.9 | 29.2 | 35.7 | 23.8 | 28.3 | 36.7 |
| Emb. Cal., mils | 1.23 | .96 | .81 | 1.24 | 1.03 | .77 |
| Gurley, seconds | 216 | 159 | 127 | 3608 | 2140 | 1095 |
| WVTR, $g/m^2/24$ | 7950 | 8350 | 8450 | 2575 | 3675 | 4010 |
| MD Tear, g | 400 | 360 | 330 | 418 | 405 | 292 |
| TD 170° F. | 8.0 | 7.2 | 7.2 | 7.2 | 7.0 | 6.5 |
| Opacity, % | 66.2 | 62.3 | 59.1 | 51.6 | 48.3 | 44.9 |
| MD 10%, g/in | 299.6 | 221.6 | 191.9 | 434.4 | 369.6 | 288.1 |
| MD 25%, g/in | 383.3 | 247.1 | 213.0 | 435.0 | 368.2 | 285.3 |
| MD Ult, g/in | 496.9 | 323.6 | 296.5 | 501.6 | 411.9 | 304.7 |
| MD Elg., % | 327.5 | 290.0 | 331.2 | 293.1 | 276.4 | 271.4 |
| TD 10%, g/in | 737.3 | 623.6 | 513.7 | 932.9 | 836.4 | 678.6 |
| TD 25%, g/in | 1182 | 1003 | 851.8 | 1503 | 1342 | 1111 |
| TD Ult, g/in | 2261 | 1863 | 1574 | 2942 | 2689 | 2197 |
| TD Elg., % | 110.2 | 100.7 | 95.5 | 103.5 | 103.3 | 97.1 |
| DR Limit $g/m^2$ | 13.4 | — | — | 10.3 | — | — |

●The "DR Limit" is the basis weight at which we first observed draw resonance. The DR probe was conducted with the fpm fixed at 340 and the extruder RPM reduced gradually until the onset of draw resonance.

TABLE 4

175° F. Orientation
4.5 mil precursor film

| PROPERTY | Example 16 50% $CaCO_3$ in ECD-115 4:1 Draw Ratio | Example 17 50% $CaCO_3$ in ECD-115 6:1 Draw Ratio | Example 18 50% $CaCO_3$ in LL3003.09 4:1 Draw Ratio | Example 19 50% $CaCO_3$ in LL3003.09 6:1 Draw Ratio |
|---|---|---|---|---|
| Basis Weight, $g/m^2$ | 54.7 | 34.5 | 54.84 | 34.87 |
| Embossed Caliper, mils | 2.43 | 1.93 | 3.29 | 2.79 |
| WVTR, $g/m^2$/24 hours | 6100 | 7950 | 6500 | 7250 |
| Gurley Porosity, sec/100 cc | 855 | 307 | 581 | 379 |
| MD Tensile at 5%, g/in | 1094 | 1289 | 1084 | 1344 |
| MD Tensile at 10%, g/in | 2290 | 3034 | 2192 | 3041 |
| MD Tensile at 25%, g/in | 4540 | — | 3774 | — |
| MD Tensile at Break, g/in | 7273 | 7725 | 5085 | 6135 |
| MD Elong. at Break, % | 73.48 | 19.65 | 78.74 | 20.78 |
| TD Tensile at 5%, g/in | 201.1 | 102.4 | 178.7 | 104.9 |
| TD Tensile at 10%, g/in | 333.4 | 196.5 | 293.4 | 184.7 |

TABLE 3

ORIENTED FILM PROPERTIES
For samples based on Exceed ™ ECD-112 blended with LDPE (LD-202)

| PROPERTIES | Example 10 37.5% ECD 12.5% LD 50% Calc 22 $g/m^2$ | Example 11 37.5% ECD 12.5% LD 50% Calc 18.5 $g/m^2$ | Example 12 37.5% ECD 12.5% LD 50% Calc 15 $g/m^2$ | Example 13 56.3% ECD 8.7% LD 35% Calc 22 $g/m^2$ | Example 14 56.3% ECD 8.7% LD 35% Calc 15.0 $g/m^2$ | Example 15 56.3% ECD 8.7% LD 35% Calc 12 $g/m^2$ |
|---|---|---|---|---|---|---|
| Basis Wt., $g/m^2$ | 22.1 | 17.9 | 14.7 | 22.9 | 13.9 | 12.1 |
| Yield, $yd^2/lb.$ | 24.6 | 30.3 | 36.9 | 23.7 | 39.0 | 44.8 |
| Emb. Cal., mils | 1.08 | .99 | .73 | 1.11 | .70 | .62 |
| Gurley, seconds | 1345 | 814 | 398 | 13,703 | 6930 | 3717 |
| WVTR, $g/m^2/24$ | 4800 | 5725 | 5925 | 950 | 1100 | 2350 |
| MD Tear, g | 98 | 90 | 85 | 371 | 189 | 187 |
| TD 170° F. | 6.0 | 6.8 | 7 | 6 | 7 | 7 |
| Opacity, % | 59.7 | 55.6 | 51.2 | 50.6 | 40.3 | 37.7 |
| MD 10%, g/in | 361.3 | 304.6 | 255.4 | 472.8 | 331.2 | 277 |
| MD 25%, g/in | 391.6 | 331.9 | 281.9 | 526.7 | 327.2 | 280.2 |
| MD Ult., g/in | 441.1 | 367.7 | 311.4 | 526.7 | 352.8 | 296.5 |
| MD Elg., % | 163.2 | 137.3 | 103.2 | 259.8 | 202.8 | 177.2 |
| TD 10%, g/in | 641.4 | 520.5 | 435.5 | 828.2 | 560 | 460.5 |
| TD 25%, g/in | 985 | 806.4 | 678.2 | 1294 | 888.4 | 733.4 |
| TD Ult., g/in | 1578 | 1307 | 1197 | 2569 | 1912 | 1408 |
| TD Elg., % | 97.8 | 96.6 | 104.2 | 110.0 | 113.2 | 103.3 |
| DR Limit $g/m^2$ | <11.5 | — | — | <6.4 | — | — |

●The "DR Limit" is the basis weight at which we first observed draw resonance. The DR probe was conducted with the fpm fixed at 340 and the extruder RPM reduced gradually until the onset of draw resonance.

TABLE 4-continued

| PROPERTY | Example 16 50% $CaCO_3$ in ECD-115 4:1 Draw Ratio | Example 17 50% $CaCO_3$ in ECD-115 6:1 Draw Ratio | Example 18 50% $CaCO_3$ in LL3003.09 4:1 Draw Ratio | Example 19 50% $CaCO_3$ in LL3003.09 6:1 Draw Ratio |
|---|---|---|---|---|
| | 175° F. Orientation 4.5 mil precursor film | | | |
| TD Tensile at 25%, g/in | 432.9 | 317.6 | 375.9 | 263.9 |
| TD Tensile at Break, g/in | 568.6 | 318.1 | 482.8 | 276.9 |
| TD Elong. at Break, % | 350.1 | 241.7 | 315.7 | 228.5 |
| MD Elmendorf Tear, grams | 4 | 0 | 2 | 13.2 |
| MD Shrink at 170° F., % | 13.5 | 17.6 | 10.5 | 16.0 |
| TD Shrink at 170° F., % | −3.0 | −3.1 | −3.8 | −2.9 |

Note:
All samples oriented with a 15 fpm inlet speed, 190° F. annealing and 5% relaxation.

TABLE 5

| PROPERTY | Example 20 50% $CaCO_3$ in ECD-115 4:1 Draw Ratio | Example 21 50% $CaCO_3$ in ECD-115 6:1 Draw Ratio | Example 22 50% $CaCO_3$ in LL3003.09 4:1 Draw Ratio | Example 23 50% $CaCO_3$ in LL3003.09 6:1 Draw Ratio |
|---|---|---|---|---|
| | 175° F. Orientation 6.0 mil precursor film | | | |
| Basis Weight, $g/m^2$ | 63.19 | 47.95 | 65.72 | 44.47 |
| Embossed Caliper, mils | 3.30 | 2.68 | 3.20 | 2.55 |
| WVTR, $g/m^2$ 24 hours | 5450 | 7500 | 6250 | 7800 |
| Gurley Porosity, sec/100 cc | 1151 | 363 | 541 | 282 |
| MD Tensile at 5%, g/in | 1336 | 1597 | 1370 | 1659 |
| MD Tensile at 10%, g/in | 2837 | 3691 | 2758 | 3686 |
| MD Tensile at 25%, g/in | 5598 | — | 4736 | 5025 |
| MD Tensile at Break, g/in | 9294 | 9934 | 6131 | 7479 |
| MD Elong. at Break, % | 78.35 | 21.08 | 75.56 | 24.07 |
| TD Tensile at 5%, g/in | 303.9 | 121.3 | 241.8 | 144.2 |
| TD Tensile at 10%, g/in | 473.4 | 238.2 | 379.2 | 245.6 |
| TD Tensile at 25%, g/in | 589.7 | 421.6 | 473.8 | 326.9 |
| TD Tensile at Break, g/in | 820.8 | 464.8 | 634.7 | 356.5 |
| TD Elong. at Break, % | 388.0 | 330.2 | 356.8 | 270.3 |
| MD Elmendorf Tear, grams | 0 | 0 | 13.2 | 13.2 |
| MD Shrink at 170° F., % | 13 | 18 | 11.5 | 14.9 |
| TD Shrink at 170° F., % | −3 | −3 | −3 | −2.5 |

Note:
All samples oriented with a 15 fpm inlet speed, 190° F. annealing and 5% relaxation.

TABLE 6

| PROPERTY | | Example 24 mLLDPE 50% $CaCO_3$ 2.7:1 draw ratio | Example 25 Z-N LLDPE 50% $CaCO_3$ 3.8:1 draw ratio |
|---|---|---|---|
| Yield | $yd^2/lb$ | 23.62 | 26.23 |
| Basis Weight | $g/m^2$ | 23.13 | 20.85 |
| Embossed Caliper | mils | 1.26 | 1.61 |
| Gurley Porosity | Seconds/100 cc | 251 | 230 |
| WVTR | $g/m^2$/24 hours | 7613 | 7688 |
| MD Tensile at 5% Elg. | grams/in | 195.5 | 174.7 |
| MD Tensile at 10% Elg. | grams/in | 269.1 | 272.9 |
| MD Tensile at 25% Elg. | grams/in | 301.7 | 321.8 |
| MD Tensile at Break | grams/in | 477.6 | 431.7 |
| MD Elong. at Break | % | 346.4 | 293.7 |
| TD Tensile at 5% Elg. | grams/in | 371.5 | 553.3 |
| TD Tensile at 10% Elg. | grams/in | 622.0 | 980.4 |
| TD Tensile at 25% Elg. | grams/in | 932.9 | 1702 |
| TD Tensile at Break | grams/in | 1650 | 2162 |
| TD Elong. at Break | % | 116.5 | 86.4 |
| TD Shrinkage at 170° F. | % | 4.2 | 4.0 |

We claim:

1. A process for making a polyolefin film having high WVTR, comprising:

a) mixing at least one polyethylene with a filler in a ratio of 10/80 to 80/20;

b) extruding a film from the polyethylene/filler mixture of a);

c) stretching the film to a sufficient amount to achieve a WVTR at least 10% higher than the WVTR described by the equation:

$$WVTR=-10{,}900+320\ (\text{filler weight }\%)$$

wherein said polyethylene has a Mw/Mn less than 3, and a CDBI greater than 50%.

2. The process of claim 1, and wherein said filler is $CaCO_3$ and said filler is present in said mixture from 30–60% based on the total polyethylene content, and wherein said stretched film has a WVTR at least 20% higher than the WVTR of the equation in claim 1.

3. The process of claim 1 wherein said polyethylene has a $M_w/M_n$ less than 2.5 and a CDBI greater than 65%, and wherein said filler is $CaCO_3$ and is present 30–50% based on the total polyethylene content, wherein and drawdown is at least 30% less than the drawdown expressed by the equation of claim 1, and where said stretched film has a WVTR at least 30% higher than the WVTR of the equation in claim 1.

4. A polyethylene film having a high WVTR, made by a process comprising:

a) combining a polyethylene having Mw/Mn less than 3 with a $CaCO_3$, in a weight ratio of from 3:1 to 1:3;

b) extruding said combination into a film having a thickness between 2–4 mils;

c) stretching said film to a degree sufficient to achieve a WVTR of at least 10% greater than the WVTR described by the equation:

$$WVTR=-10{,}900+320\ (CaCO_3\text{ weight }\%).$$

5. A method for producing a polyolefin film comprising:

a) adding a filler to at least one polyethylene, where said polyethylene has a Mw/Mn of up to 2.5, at a filler to polyethylene ratio of 3:1–1:3;

b) forming a film from the polyethylene/filler of a) wherein said film, after stretching in the TD in a ratio from the initial dimension of 2:1–4:1 has a WVTR at least 20% greater than the WVTR described by the equation:

$$WVTR=-10{,}900+320\ (\text{weight \% filler}).$$

6. A method of making a filled polyethylene film having a thickness up to 3 mils, comprising:

a) forming a film from a polyethylene having a Mw/Mn less than 2.5, combined with $CaCO_3$ in a ratio polyethylene filler 3:1–1.3, wherein said film has a thickness, as extruded up to 3 mils.

7. The method of claim 6, wherein said film has a thickness as extruded up to 2.5 mils.

8. The method of claim 7 wherein said method additionally comprises stretching said film by at least 2:1 and heat setting said stretch by heating said stretched film at a temperature below the softening temperature of the stretched film.

9. A polyethylene film having a high WVTR made by a process comprising:

a) combining a polyethylene having a Mw/Mn less than 3 and a CDBI greater than 60% with a filler, b) forming a film from the combination of a), c) stretching said film of b) to a sufficient degree to achieve a WVTR of at least 10% greater than the WVTR described by the equation:

$$WVTR=10{,}900+320\ (\text{filler weight \%}).$$

* * * * *